F. RIGHTMIRE.
ANTISKID CHAIN TIGHTENER.
APPLICATION FILED AUG. 4, 1920.

1,405,003.
Patented Jan. 31, 1922.

WITNESS:
Wm. Bell.

INVENTOR,
Franklin Rightmire.
BY
ATTORNEY

UNITED STATES PATENT OFFICE.

FRANKLIN RIGHTMIRE, OF PATERSON, NEW JERSEY.

ANTISKID-CHAIN TIGHTENER.

1,405,003. Specification of Letters Patent. Patented Jan. 31, 1922.

Application filed August 4, 1920. Serial No. 401,170.

*To all whom it may concern:*

Be it known that I, FRANKLIN RIGHTMIRE, a citizen of the United States, residing at Paterson, in the county of Passaic and State of New Jersey, have invented certain new and useful Improvements in Antiskid-Chain Tighteners, of which the following is a specification.

The object of this invention is to provide a tightening device for anti-skid chains for vehicles, such as the so-called Weed chain, which shall be simple and inexpensive in construction, efficient and reliable in operation, light in weight, easily applied and removed, and adapted to be packed in comparatively small compass when not in use.

The invention consists in a tightener of the class indicated including an elastic approximately straight flexible member having an attaching point at each end-portion and also at the intermediate portion thereof and adapted to be connected at each of said attaching points with an anti-skid chain in place on a tire-tread and thereby held fixed and under tension. The invention further consists of a tightener including, in combination, with the above-defined member, a connecting means attached to its said intermediate attaching point, said means in the preferred form of the invention including another such member.

Figure 1:
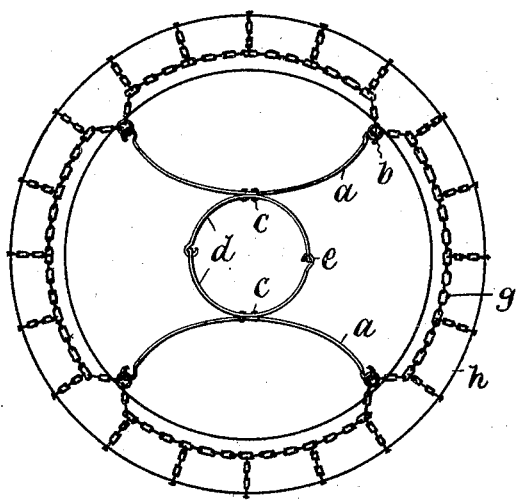
Figure 1 is a side elevation of a wheel having an anti-skid chain and my device holding the chain tight.
Figure 2:
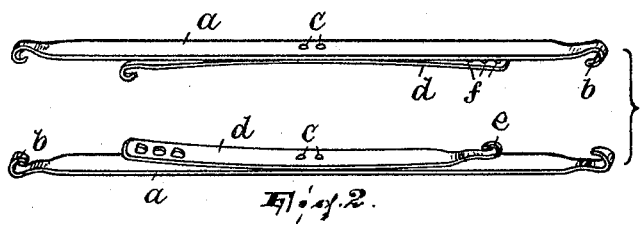
Figure 2 shows the two parts of the device as shown in Figure 1 removed and disconnected and in their relaxed or straight form.

In Figures 1 and 2, $a$ $a$ indicates a pair of elastic straight flexible members in the form of steel blades or strips, each having its ends rebent to form hooks $b$, the hooks projecting both in the same direction from the blade. Secured by rivets $c$ or otherwise to and face to face with each member $a$ is an elastic straight flexible member $d$ also in the form of a steel blade or strip, the same having one end formed with a hook $e$ and the other end with a longitudinal series of holes $f$. The anti-skid chain $g$ being in place on the tire $h$ the hooks $b$ of the members $a$ $a$ are engaged with links of said chains and the hook $e$ of each member $d$ is engaged in one of the holes $f$ of the complementary member $d$, the result of which is that the several members are bowed and put under tension, thus drawing the chain tight. It will be understood that adjustment may be effected by engaging each hook $e$ in one or the other of the holes $f$.

Figures 3, 4:
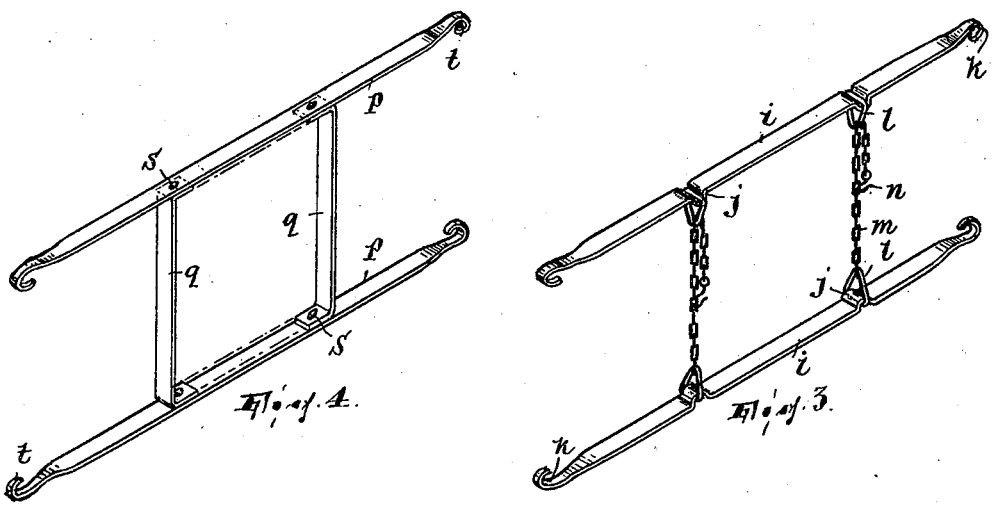
Figures 3 and 4 illustrate modifications of the device.

In Figure 3 the members $i$ $i$ are substantially the same as the members $a$ $a$, but their attaching points at the intermediate portions thereof are formed by bends $j$ $j$ extending in the same direction from the blade, in each instance, as the hooks $k$ $k$ at the ends. There are flexible inelastic connections between the members $i$ $i$ in this instance, the same in the illustrated example consisting of eyes $l$ $l$, embracing and engaged in the bends $j$ $j$ of members $i$ $i$, and chains $m$, each chain being permanently attached at one end to one of the eyes and having a hook $n$ at its free end to engage in any link of the chain (for the purpose of adjustment).

In Figure 4 the members $p$ $p$ are again substantially the same as the members $a$ $a$. The connections between the members $p$ $p$ are in this case rigid and rigidly attached to them, the connections being in the form of stiff blades $q$ $q$ having the ends bent off and secured by rivets $s$ to the intermediate portion of each member $p$ $p$.

It will be understood that in the device as shown in Figure 3 the hooks $k$, and in the device as shown in Figure 4 the hooks $t$, are adapted to be engaged with the links of the anti-skid chain, the same as illustrated in Figure 1, so that the members $i$ $i$ and $p$ $p$ are put under tension, thus drawing the chain tight.

It will be understood that such a member as the statement of invention embodied in the opening part of this specification defines is afforded in Figures 1 and 2 by either element $a$ $a$, in Figure 3 by either element $i$ $i$, and in Figure 4 by either element $p$ $p$; in Figure 1 it is also afforded by either element $d$ $d$. The combination defined in said statement of invention is afforded in Figures 1 and 2 by either member $a$ $a$ as the "member" and the elements $d$ $d$ $a$ as the "means," or by either element $d$ $d$ as the "member" and the element $a$ which is affixed thereto as the "means," such element $d$ in this instance being attached at its end attaching points not directly, but indirectly (through the other members $d$ $a$), to the chain; said combination is afforded in Figure 3 (or 4) by either element $i\ i$ (or $p\ p$) as the "member" and the elements $m\ i$ (or $q\ p$) as the "means."

Having thus fully described my invention, what I claim as new and desire to secure by Letters Patent is:—

1. A tightener for anti-skid tire chains including an elastic approximately straight flexible member having an attaching point at each end-portion and also at the intermediate portion thereof and adapted to be connected at each of said attaching points with a chain in place on a tire and thereby held flexed and under tension.

2. A tightener for anti-skid chains including, in combination, with an elastic approximately straight flexible member having attaching points at both end-portions and also at the intermediate portion thereof, means, attached to said intermediate point, to connect the same with the chain, said member when the attaching points at its said end portions and said means are connected to a chain in place on a tire being adapted to be thereby held flexed and under tension.

3. A tightener for anti-skid chains including, in combination, with a pair of elastic approximately straight flexible members each having attaching points at both end-portions thereof, means to connect the intermediate portion of each member with the other, said members when the attaching points at their said end-portions are all connected to a chain in place on a tire being adapted to be thereby held flexed and under tension.

4. A tightener for anti-skid tire chains including an elastic approximately straight flexible member having an attaching point at each end-portion and also at the intermediate portion thereof and adapted to be connected at each of said attaching points with a chain in place on a tire and thereby held flexed and under tension, the extremities of said member being rebent and forming the attaching points at its said end-portions.

5. A tightener for anti-skid chains including a pair of elastic approximately straight flexible members each having attaching points at both end portions thereof and secured at its intermediate portion to the intermediate portion of the other member and face to face therewith and adapted to be connected at their said attaching points with a chain in place on a tire and thereby held flexed and under tension.

In testimony whereof I affix my signature.

FRANKLIN RIGHTMIRE.